United States Patent
Weicker

(10) Patent No.: US 10,023,056 B2
(45) Date of Patent: Jul. 17, 2018

(54) INTEGRATED TRAILER HITCH AND JUMP START SYSTEM

(71) Applicant: Faraday&Future Inc., Gardena, CA (US)

(72) Inventor: Phillip John Weicker, Pasadena, CA (US)

(73) Assignee: FARADAY&FUTURE INC., Gardena, CA (US)

( * ) Notice: Subject to any disclaimer, the term of this patent is extended or adjusted under 35 U.S.C. 154(b) by 181 days.

(21) Appl. No.: 15/050,077

(22) Filed: Feb. 22, 2016

(65) Prior Publication Data

US 2017/0240059 A1  Aug. 24, 2017

(51) Int. Cl.
*H02J 7/00* (2006.01)
*B60L 11/18* (2006.01)
*B60D 1/64* (2006.01)

(52) U.S. Cl.
CPC ............ *B60L 11/1812* (2013.01); *B60D 1/64* (2013.01); *B60L 11/1818* (2013.01); *H02J 7/0029* (2013.01); *H02J 7/0054* (2013.01); *B60L 2210/14* (2013.01); *H02J 2007/0037* (2013.01)

(58) Field of Classification Search
CPC .................................................... H02J 7/0029
USPC ....................................................... 320/105
See application file for complete search history.

(56) References Cited

U.S. PATENT DOCUMENTS

| | | | | |
|---|---|---|---|---|
| 6,107,691 A | * | 8/2000 | Gore | B60L 11/1816 290/1 R |
| 8,120,310 B2 | * | 2/2012 | Littrell | H02J 7/35 320/101 |
| 2006/0055378 A1 | * | 3/2006 | Bauerle | H02J 7/14 322/28 |
| 2006/0254806 A1 | * | 11/2006 | White | B60D 1/62 174/135 |
| 2009/0229895 A1 | * | 9/2009 | Gibbs | B60K 6/48 180/11 |
| 2010/0141201 A1 | * | 6/2010 | Littrell | H02J 7/35 320/101 |
| 2011/0025267 A1 | * | 2/2011 | Kamen | B60L 8/003 320/109 |
| 2015/0015183 A1 | * | 1/2015 | Pursifull | B60L 11/1816 320/105 |
| 2017/0349039 A1 | * | 12/2017 | Rayner | B60K 1/04 |

* cited by examiner

*Primary Examiner* — Suchin Parihar
(74) *Attorney, Agent, or Firm* — Knobbe Martens Olson & Bear LLP

(57) ABSTRACT

The present disclosure relates to devices, systems, and methods for jump starting an electric vehicle. In some embodiments, an electric vehicle includes battery charging circuitry electrically connected to a high voltage storage system and a low voltage storage system mounted in the vehicle. The high voltage storage system may be configured to drive a motor for propelling the vehicle. The low voltage storage system may be configured to drive a contactor electrically connected between the high voltage storage system and a drive train of the vehicle. In some implementations, the vehicle may include an electrical connection that is easily accessible and configured to supply power from an external power source to the low voltage system. The electrical connection may be integrated into a standard trailer wiring system.

21 Claims, 4 Drawing Sheets

INTEGRATED TRAILER HITCH AND JUMP START SYSTEM

BACKGROUND

Field

This disclosure relates to vehicle battery systems, and more specifically to systems and methods for externally charging a low-voltage battery in an electric vehicle.

Description of the Related Art

Electric vehicles may use a high voltage (e.g. 400 V) battery system to propel the vehicle. This may be referred to herein as a first battery. An electric vehicle may also include a low voltage battery system to power various other functions (e.g., lights, windows, and ignition). This may be referred to herein as a second battery. Electric vehicles may thus include a low voltage battery similar to the low voltage batteries found in conventional automobiles. The output from the first battery may be stepped down and used to charge the second battery.

SUMMARY OF THE INVENTION

The systems and methods of this disclosure each have several innovative aspects, no single one of which is solely responsible for its desirable attributes. Without limiting the scope as expressed by the claims that follow, its more prominent features will now be discussed briefly.

In one implementation, a jump start system comprises battery charging circuitry electrically connected to a first battery and a second battery mounted in a vehicle, the first battery configured to drive a motor for propelling the vehicle and the second battery configured to drive a contactor electrically connected between the first battery and a drive train of the vehicle, and a trailer wiring connector in electrical communication with the battery charging circuitry, the trailer wiring connector forming a charge port configured to receive an electrical current and transmit the electrical current to the battery charging circuitry to charge the second battery.

In another implementation, a system for jump starting an electric vehicle comprises battery charging circuitry electrically connected to a high voltage storage system and a low voltage storage system mounted in a vehicle, the high voltage storage system configured to drive a motor for propelling the vehicle and the low voltage storage system configured to drive a contactor electrically connected between the high voltage storage system and a drive train of the vehicle, and an external trailer wiring connector located within or adjacent to a tow hitch electrically connected to the low voltage storage system and configured to receive a current input from an external power source.

In another implementation, a method of jump starting an electric vehicle comprises receiving, at a wiring connector of the electric vehicle, a current from an external power source, transmitting the received electric current from the wiring connector to a positive terminal of a low voltage battery of the electric vehicle to at least partially charge the low voltage battery, and engaging a high voltage battery of the electric vehicle after the low voltage battery is at least partially charged.

BRIEF DESCRIPTION OF THE DRAWINGS

The above-mentioned aspects, as well as other features, aspects, and advantages of the present technology will now be described in connection with various implementations, with reference to the accompanying drawings. The illustrated implementations are merely examples and are not intended to be limiting. Throughout the drawings, similar symbols typically identify similar components, unless context dictates otherwise.

FIG. 2a is an enlarged view of the trailer wiring connector of FIG. 2.

DETAILED DESCRIPTION OF THE PREFERRED EMBODIMENT

Figure 1:
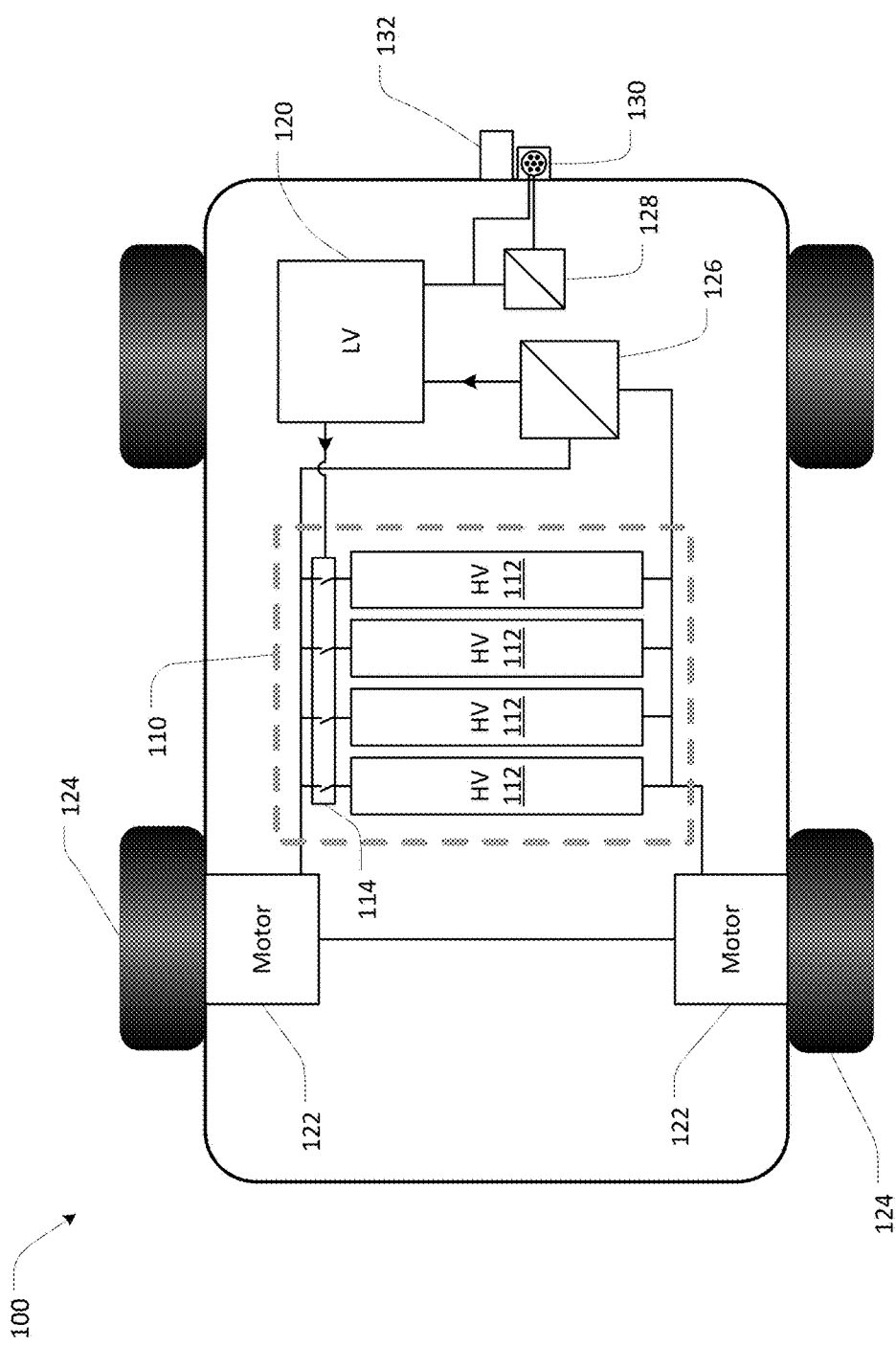
FIG. 1 is a schematic view of an electric vehicle having a trailer wiring connector jump start system in accordance with an exemplary embodiment.

The following description is directed to certain implementations for the purpose of describing the innovative aspects of this disclosure. However, a person having ordinary skill in the art will readily recognize that the teachings herein can be applied in a multitude of different ways. The described implementations may be implemented in any vehicle or battery system.

Electric vehicles may include one or more high voltage batteries having significant energy storage capacity. Such batteries or battery systems may be configured to power, for example, the electric traction motors that propel the vehicle. In some implementations, in addition to powering the vehicle's propulsion motors, the high voltage batteries' output may also be stepped down using one or more DC-to-DC converters to power some or all of the other lower voltage vehicle systems. Such systems include, but are not limited to, the interior and exterior lights, power assisted braking, power steering, infotainment, navigation, audio systems, wireless internet, automobile diagnostic systems, power windows, door handles, and various other systems that require electricity.

In some implementations, the high voltage system or high voltage batteries may be selectively be connected to or isolated from other vehicle circuitry. This may be accomplished, for example, by magnetic contactors that can open and close. In some instances, the contactors can be designed such that they remain open in an unpowered configuration. That is to say, nominally open contactors may require a power supply in order to enter and/or remain in the closed circuit position. Such contactors can ensure that the high voltage batteries remain disconnected from the drive train when the vehicle is powered off. On startup, a small power input may be required to close at least one contactor of the high voltage battery pack. After at least one contactor is closed, at least some of the high voltage batteries may supply the power needed to keep the contactor(s) closed.

If the low voltage system discharges or does not have enough power to close at least one contactor (due to, e.g., a power draw or self-discharge) it may be unable to engage the high voltage batteries. In such a case, a "jump start" may be required in order to supply enough power to engage the starting process. In other words, if the low voltage system does not have enough power storage to engage the first contactor, and/or other starting systems that require electric power, a power source that is external to the electric vehicle may be needed.

Jump starting typically involves attaching a jumper cable clip to the positive post of the dead battery. This may be a problem if the vehicle with the weak or dead battery requires electric power to access it. For example, the engine compartment or trunk may have an electric opening system rather than mechanical handles. In addition, motorists with little vehicle maintenance experience may be unable or unwilling to safely attach jumper cables to battery terminals. Thus, an external charge port may allow a vehicle with a discharged low voltage battery to be jump started. In vehicles equipped with trailer hitches, it may be efficient to combine the jump start charge port with a trailer wiring connector.

FIG. 1 is a simplified diagram depicting an electric vehicle 100 having a trailer wiring connector jump start system in accordance with an exemplary embodiment. The electric vehicle 100 includes a high voltage battery pack 110 and a low voltage battery 120. The high voltage battery pack includes at least one high voltage battery string 112 and magnetic contactors 114 configured to connect and disconnect each string from the other circuitry of the vehicle 100. The high voltage battery pack may be electrically connected to electric traction motors 122, which maybe mechanically coupled to power the vehicle's drive wheels 124. The high voltage battery pack may be further connected to a high voltage DC-to-DC converter 126. A low voltage DC-to-DC converter 128 may be connected to the low voltage battery 120 and a trailer wiring connector 130. The trailer wiring connector 130 can be disposed adjacent to a trailer hitch 132.

In ordinary operation, the vehicle 100 may be started up from a powered off state using the low voltage battery 120. When a startup is commenced, the low voltage battery 120 can provide electric current to a contactor 114, closing at least one high voltage battery circuit. Once at least one high voltage contactor 114 is closed, at least a portion of the high voltage battery pack 110 may be engaged. In this way, enough power is available to complete a vehicle start routine. In embodiments with a high voltage battery pack 110 divided into multiple independently switchable battery strings 112, additional contactors 114 may subsequently be closed to engage additional strings 112 in order to access more power.

After startup, the high voltage battery pack 110 may provide power to the motors 122 to turn the drive wheels 124 and propel the vehicle 100. Additionally, the high voltage battery pack 110 may send electric current to one or more high voltage DC-to-DC converters 126, which may be stepped down to a lower voltage. The low voltage may be sent to the low voltage battery 120 in order to recharge the low voltage battery 120 or routed to other low voltage systems.

The high voltage battery pack 110 typically has an energy storage capacity significantly larger than the capacity of the low voltage battery 120 and is capable of repeatedly recharging the low voltage battery 120. In some embodiments, the high voltage battery pack 110 may be connected to a plurality of high voltage DC-to-DC converters 126 to provide current at a variety of output voltages appropriate for powering various electrical systems of the vehicle 100. For example, powering exterior lights or closing high voltage contactors 114 may require a lower voltage than an electric braking assist system. In some embodiments, the various vehicle systems may be powered directly from high voltage DC-to-DC converters 126. In some embodiments, vehicle systems may be powered by the low voltage battery 120, either directly or through low voltage DC-to-DC converters 128, while the low voltage battery 120 is continuously or intermittently recharged from the high voltage DC-to-DC converter 126.

If the low voltage battery 120 of the vehicle 100 becomes discharged to the extent that it does not have sufficient energy stored to close a high voltage battery contactor 114, the startup process described above will be unsuccessful. Although the high voltage battery pack 110 is capable of powering all vehicle systems and recharging the low voltage battery 120, any energy stored within the high voltage battery pack 110 may be unavailable when the contactors 114 cannot be closed. Thus, the vehicle 100 may need to be jump started. As will be described in greater detail below with reference to FIGS. 2 and 3, the vehicle 100 may have circuitry configured to allow the low voltage battery 120 to be recharged from a current input at the trailer wiring connector 130. A current input may be a DC current drawn from an external source such as the low voltage battery of another vehicle, or from any other source such as an AC/DC adapter.

Once a current source is connected to the electric vehicle 100 at the trailer wiring connector 130, the low voltage battery 120 can begin charging. It is not necessary to fully charge the low voltage battery 120 to jump start the vehicle 100. Instead, the low voltage battery 120 may be charged for a relatively short time until it has at least enough energy to close a contactor 114 of the high voltage battery pack 110. For example, an external power source that may take over an hour to fully charge the discharged low voltage battery 120 may be able to charge the low voltage battery 120 enough to close a high voltage contactor 114 in a much shorter time, for example, 5 to 10 minutes. Once a first contactor 114 is closed, the external charge source may be disconnected, as the low voltage battery 120 may be fully replenished from the high voltage battery pack 110 with no external assistance, as described above. Closing a first contactor 114 may occur based on a user command, or may occur automatically during the jump start sequence upon the low voltage battery 120 accumulating sufficient charge.

Figure 2:
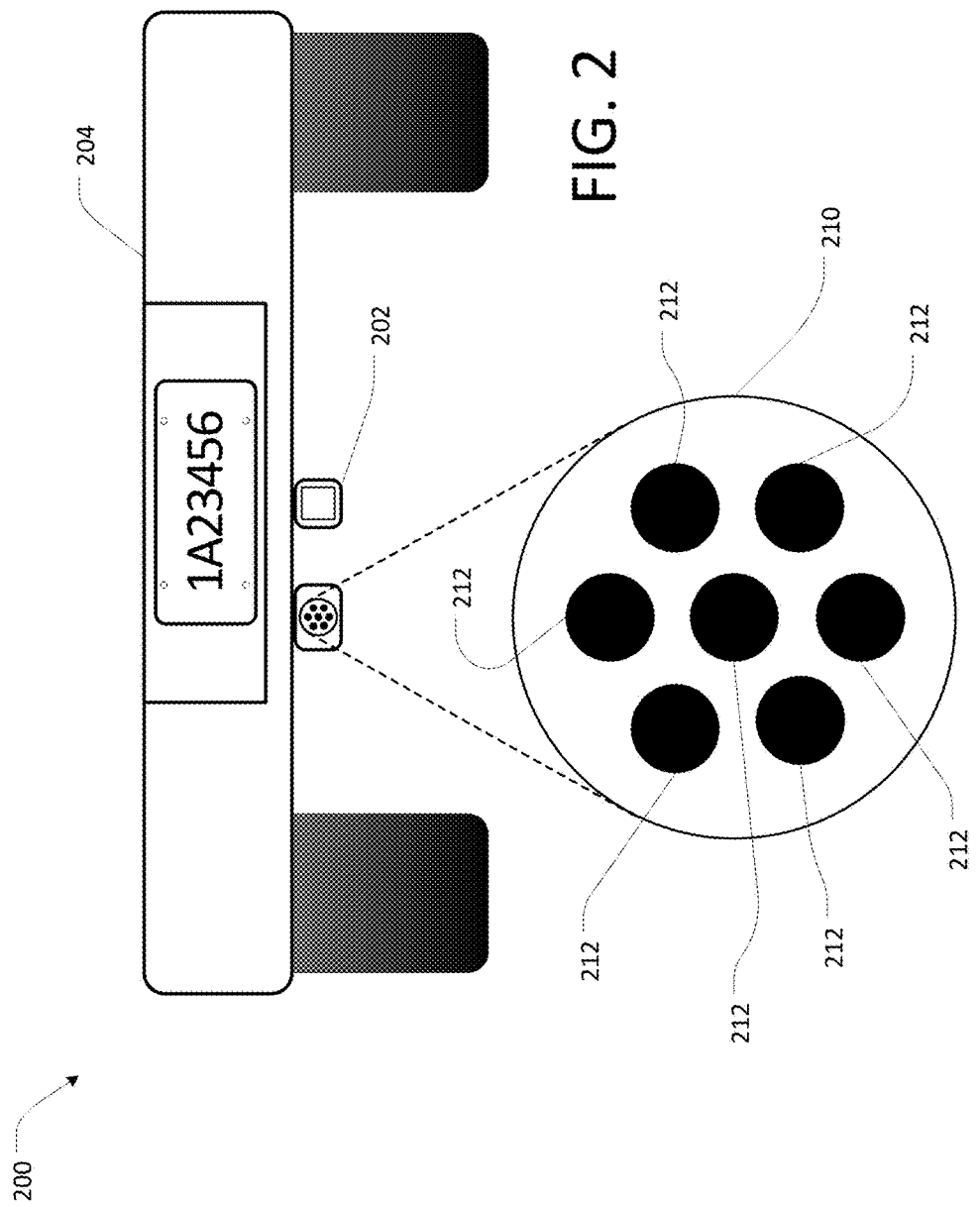
FIG. 2 is a schematic view of the electric vehicle of FIG. 1. As shown, the vehicle include a trailer hitch and a trailer wiring connector.

FIG. 2 depicts an external charge port arrangement of a battery jump start system in accordance with an exemplary embodiment. In some embodiments, a vehicle 200 may have a trailer hitch 202 secured on or near a rear bumper 204 and configured for towing trailers, other vehicles, or the like. A vehicle 200 with a trailer hitch 202 typically has a trailer wiring connector 210 located near the trailer hitch 202. Trailer wiring connectors 210 are well known in the art and available in several standard, commercially available configurations. Trailer wiring connectors allow for electrical connections between a towing vehicle and a trailer. A trailer wiring connector has a plurality of output pins 212 for powering the brakes and exterior lights of a trailer, as well as an output for providing auxiliary power to the trailer at roughly 12 volts. For example, a seven-pin trailer wiring connector 210 may have one ground pin, one 12 volt auxiliary power pin, one brake pin, and four pins providing power for the various lights of a trailer, such as brake lights, turn signals, reverse lights, and tail lights.

A standard trailer wiring connector 210 may serve as an external charge port for a battery jump start system in addition to serving as a power output for a trailer. The 12 volt auxiliary power pin of a trailer wiring connector 210 is generally used to provide 12 volt power from the tow vehicle 200 to power electrical systems of the trailer other than the trailer brakes and exterior lights. For example, current from the 12 volt auxiliary pin may power interior lights and/or appliances of a travel trailer. However, a pin 212 may also be wired to receive power from a charge source to charge the low voltage battery of the vehicle 200. The wiring necessary to use a 12 volt auxiliary power pin for low voltage battery charging will be described in greater detail below with reference to FIGS. 3-4C.

An adapter may be used to provide power from the charged battery of a second vehicle to the discharged battery of vehicle 200. The adapter may include a standard trailer-side connector configured to plug into the trailer wiring connector 210. Rather than connecting all pins 212 of the wiring connector 210 to trailer systems, the adapter may connect only to the 12 volt auxiliary power pin and the ground pin of the connector 210. In some embodiments, the adaptor may include positive and negative alligator clips which may be connected to the terminals of the charged battery, allowing current to flow from the positive terminal of the charged battery to the 12 volt auxiliary power pin and from the negative terminal of the charged battery to the ground pin. In some embodiments, the adaptor may include a plug sized and shaped to draw power from the "cigarette lighter" 12 volt interior power socket of a vehicle with a charged battery. Thus, an adapter allows power to be drawn from a charged vehicle battery and delivered to the vehicle 200 through trailer wiring connector 210.

Figure 3:
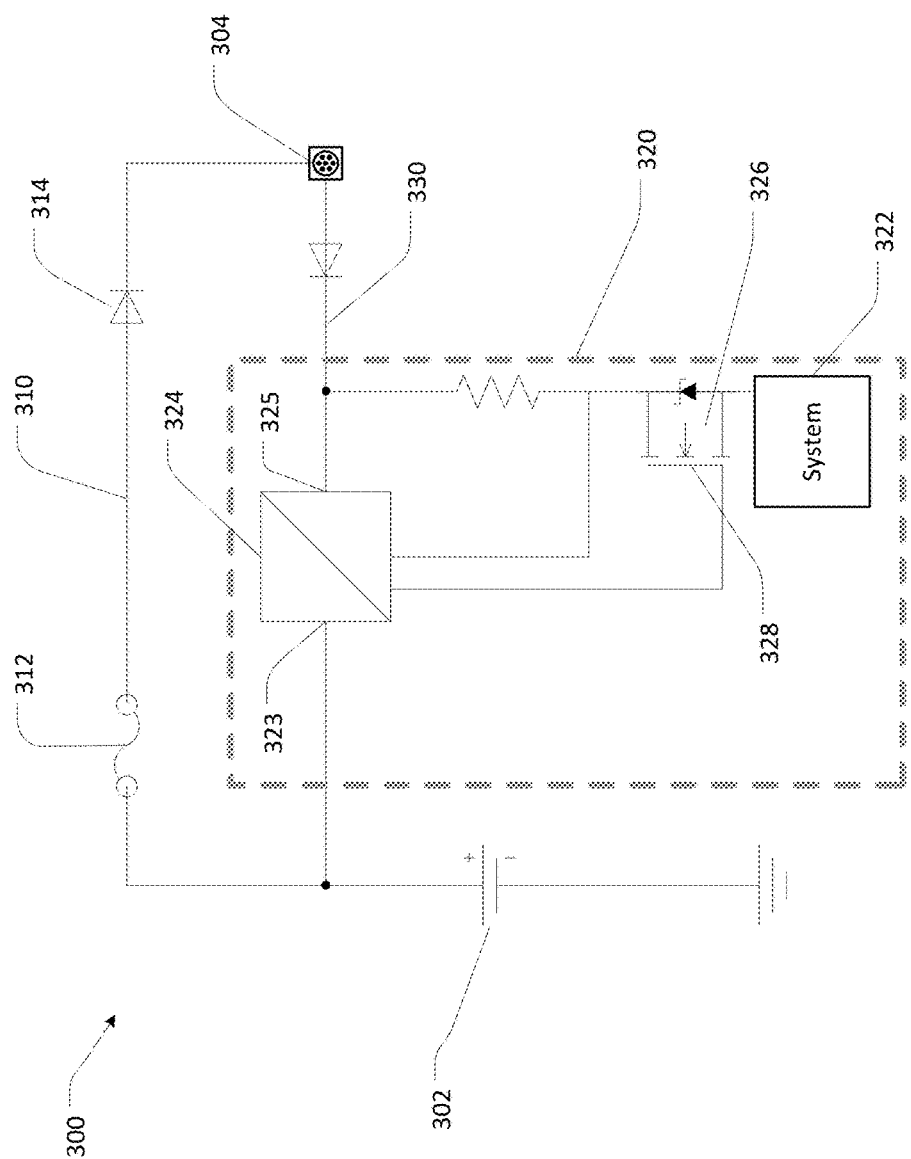
FIG. 3 is a circuit diagram depicting a trailer hitch jump start system in accordance with an exemplary embodiment.

FIG. 3 is a circuit diagram depicting a trailer hitch jump start circuit 300 in accordance with an exemplary embodiment. The jump start circuit 300 may include a low voltage vehicle battery 302 and a trailer wiring connector 304 of the same vehicle. The circuit may further include a 12 volt auxiliary power transmission path 310, a vehicle system power transmission path 320, and a jump start transmission path 330.

The 12 volt auxiliary power transmission path 310 permits the transfer of electrical power to a trailer when the vehicle is not being jump started. The general function of the auxiliary power function is described above with reference to FIG. 2. Within the vehicle, the auxiliary power circuitry 310 includes an electrical connection between the low voltage battery 302 and the 12 volt auxiliary pin of the trailer wiring connector 304, including a fuse 312 and a diode 314. Diode 314 controls the direction of current flow through the auxiliary power transmission path 310 to protect the battery 302 from an unintended reverse current. Fuse 312 protects the battery 302 from excessive current draw at the trailer wiring connector 304, for example, if a short circuit or other electrical fault occurs in the wiring within a connected trailer.

The vehicle system power transmission path 320 allows the battery 302 to power various electrical systems 322 of the vehicle, such as lights, infotainment, braking assist, or any other vehicle function requiring relatively low voltage electrical current to operate. A vehicle may include any number of system power transmission paths 302 in order to power various systems 322 requiring different operating voltages. The path 320 may further include a DC-to-DC converter 324 which steps down the full DC voltage of the battery 302 to the appropriate voltage for the system 322. A field effect transistor (FET) 326 may be located between the output 325 of the DC-to-DC converter 324 and the system 322 to be powered in order to prevent current from flowing to the system 322 when it is not being powered by the battery 302. When the battery 302 is powering the system 322, the powered DC-to-DC converter 324 can activate the gate 328 of the FET 326, allowing current to flow from the output 325 to the system 322. When the battery 302 is not providing power, such as when the battery is discharged, the gate 328 of the FET 326 remains unpowered, and current may not flow into the system 322.

The jump start transmission path 330 allows a vehicle system power transmission path 320 to be used for the additional purpose of charging the low voltage battery 302. In some embodiments, the jump start transmission path 330 may be in electrical communication with the 12 volt auxiliary power transmission path 310 at the auxiliary power pin of the trailer wiring connector 304. The jump start transmission path 330 includes a diode 332. The jump start transmission path 330 connects the auxiliary power pin to the DC-to-DC converter 324 of the vehicle system power transmission path 320 at a point along the output of the DC-to-DC converter 324. If the DC-to-DC converter 324 is bi-directional, it may be "back-fed" with a current from an external charge source connected at the trailer wiring connector. The diode 332 ensures that current only flows through path 330 in the back-feed direction, isolating the vehicle system power transmission path 320 from the trailer wiring connector 304 during ordinary operation powered by the battery 302.

Back-feeding a bi-directional DC-to-DC converter 324 allows for power to be transferred through the converter 324 from the "output" 325 to the "input" 323. In some embodiments, a bi-directional DC-to-DC converter 324 may operate in voltage-decreasing "buck" mode when current enters from the battery 302, and operate in voltage-increasing "boost" mode in the opposite direction. In some embodiments, a bi-directional DC-to-DC converter 324 may be a "buck" converter when current enters from the battery 302, but may allow current to pass in the opposite direction with no increase or decrease in voltage. To ensure that a current from the jump start transmission path 330 is delivered to the battery 302, the gate 328 of the FET 326 should receive power only when the battery 302 is providing power. When the battery 302 is being charged from the jump start transmission path 330, the inactive FET 326 will not allow current to pass, thus directing all current from path 330 through the DC-to-DC converter 324 to the battery 302.

Figure 4A:
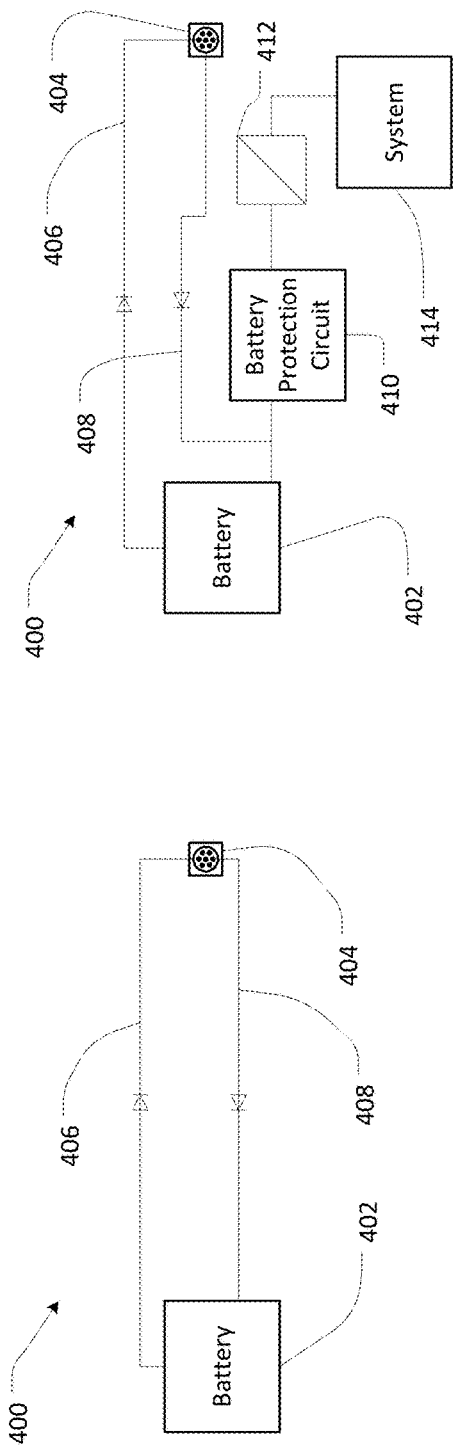
FIG. 4A is a block diagram depicting a configuration of a trailer hitch jump start system in accordance with an exemplary embodiment.
Figure 4B:
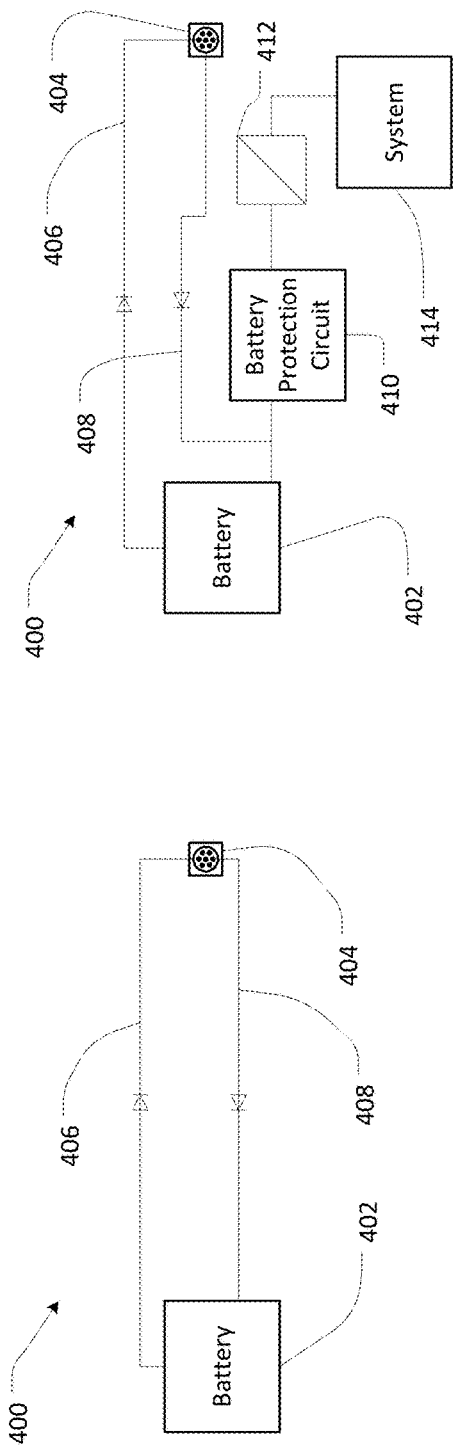
FIG. 4B is a block diagram depicting a configuration of a trailer hitch jump start system in accordance with an exemplary embodiment.
Figure 4C:
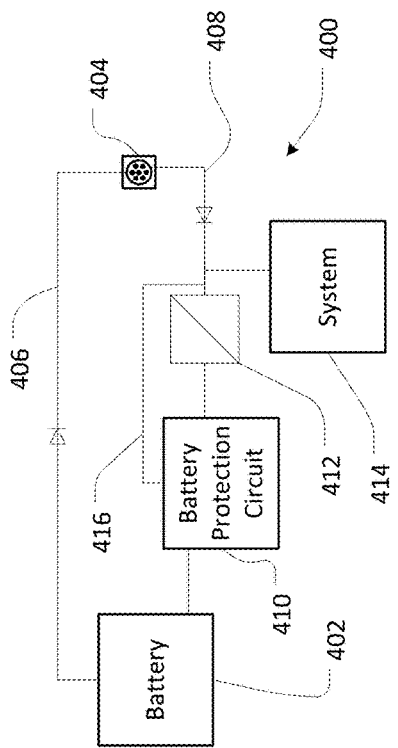
FIG. 4C is a block diagram depicting a configuration of a trailer hitch jump start system in accordance with an exemplary embodiment.

FIGS. 4A, 4B, and 4C are block diagrams depicting possible configurations of a trailer hitch jump start system 400 in accordance with an exemplary embodiment. Each depicted system includes a battery 402, a trailer wiring connector 404, a 12 volt auxiliary power transmission path 406, and a jump start transmission path 408. The configuration of FIG. 4A is a simple configuration of a jump start system 400, including no additional elements. A basic jump start system 400 could recharge the battery 402 through a jump start transmission path directly connecting the 12 volt auxiliary pin of the trailer wiring connector to a terminal of the battery 402.

The system 400 as depicted in FIG. 4B may be applied in vehicles where the low voltage battery 402 is protected by a battery protection circuit 410 between the battery 402 and any electrical systems 414 and/or DC-to-DC converters 412. A battery protection circuit 410 may protect a battery 402 from overcharging, load dumping, or other events that could damage the battery 402. A battery protection circuit 410 may include a surge stopper or similar protective circuitry to stop current flow into or out of the battery when excess current occurs. Some surge stopping circuitry may require a nominal amount of power from the battery 402 to allow any current to pass in either direction. If the battery 402 is completely discharged, it may be unable to provide the necessary power, preventing charge from traveling from the trailer wiring connector 404 to the battery 402. If such battery protection circuitry 410 is present, the jump start system 400 may instead be designed with the jump start transmission path 408 connecting between the battery 402 and the battery protection circuit 410 so as to bypass the battery protection circuit 410 and directly charge the battery 402.

FIG. 4C depicts an alternative arrangement for charging a battery 402 where battery protection circuitry 410 is present. In some embodiments including battery protection circuitry 410, the jump start transmission path 408 may direct current from the trailer wiring connector 404 to the vehicle system DC-to-DC converter 412, as described above with reference to FIG. 3. An additional bypass connection 416 may be made from the jump start transmission path 408 to the battery protection circuitry 410. The bypass connection 416 can provide the nominal current described above with reference to FIG. 4B, ordinarily provided by the battery 402, to allow current to flow through the battery protection circuit 410. For example, the battery protection circuit 410 may include a pair of FETs which allow current to pass in both directions when active, but which function as opposing diodes when their gates are unpowered. The bypass connection 416 may allow some of the current from the jump start transmission path 408 to activate the FETs in the battery protection circuitry 410, allowing the battery 402 to be charged.

The foregoing description details certain embodiments of the systems, devices, and methods disclosed herein. It will be appreciated, however, that no matter how detailed the foregoing appears in text, the devices and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated. The scope of the disclosure should therefore be construed in accordance with the appended claims and any equivalents thereof.

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

It is noted that the examples may be described as a process. Although the operations may be described as a sequential process, many of the operations can be performed in parallel, or concurrently, and the process can be repeated. In addition, the order of the operations may be rearranged. A process is terminated when its operations are completed. A process may correspond to a method, a function, a procedure, a subroutine, a subprogram, etc.

The previous description of the disclosed implementations is provided to enable any person skilled in the art to make or use the present disclosed process and system. Various modifications to these implementations will be readily apparent to those skilled in the art, and the generic principles defined herein may be applied to other implementations without departing from the spirit or scope of the disclosed process and system. Thus, the present disclosed process and system is not intended to be limited to the implementations shown herein but is to be accorded the widest scope consistent with the principles and novel features disclosed here.

What is claimed is:

1. A jump start system comprising:
  battery charging circuitry electrically connected to a first battery and a second battery mounted in a vehicle, wherein the first battery is configured to drive a motor for propelling the vehicle and the second battery is configured to drive a contactor electrically connected between the first battery and a drive train of the vehicle; and
  a trailer wiring connector located within or adjacent to a tow hitch and in electrical communication with the battery charging circuitry, the trailer wiring connector forming a charge port configured to receive an electrical current and transmit the electrical current to the battery charging circuitry to charge the second battery.

2. The vehicle of claim 1, further comprising an adapter circuit configured to deliver an electrical current from an electrical output of a second vehicle to the trailer wiring connector of the vehicle.

3. The vehicle of claim 2, wherein the adapter circuitry is configured to draw current from a battery of the second vehicle.

4. The vehicle of claim 2, wherein the adapter circuitry is configured to draw current from an interior 12 volt socket of the second vehicle.

5. The vehicle of claim 1, wherein the trailer wiring connector is further configured to provide power from the second battery to a trailer.

6. The vehicle of claim 1, wherein the trailer wiring connector is configured to receive jump start power at a single pin of the connector.

7. The vehicle of claim 6, wherein the single pin is a 12 volt auxiliary power pin.

8. The vehicle of claim 1, wherein the battery charging circuitry is further configured to draw current from a high voltage battery system in the vehicle to charge the low voltage battery.

9. A system for jump starting an electric vehicle, the system comprising:
  battery charging circuitry electrically connected to a high voltage storage system and a low voltage storage system mounted in a vehicle, wherein the high voltage storage system is configured to drive a motor for propelling the vehicle and the low voltage storage system is configured to drive a contactor electrically connected between the high voltage storage system and a drive train of the vehicle; and
  an external trailer wiring connector located within or adjacent to a tow hitch electrically connected to the low voltage storage system and configured to receive a current input from an external power source.

10. The system of claim 9, further comprising a DC-to-DC convertor coupled to the at least one high voltage storage system and the at least one low voltage storage system, the DC-to-DC convertor configured to reduce the high voltage to the low voltage.

11. The system of claim 10, wherein the external trailer wiring is coupled to the DC-to-DC convertor.

12. The system of claim 11, wherein the wherein the DC-to-DC converter is configured to transfer electric current received from the external charge port to a positive terminal of the low voltage storage system.

13. The system of claim 9, further comprising adapter circuitry configured to deliver an electrical current from a low voltage output of a second vehicle to the trailer wiring connector.

14. The system of claim 13, wherein the adaptor circuitry is configured to draw current from the poles of a low voltage battery of the second vehicle.

15. The system of claim 13, wherein the adaptor circuitry is configured to draw current from an interior 12 volt socket of the second vehicle.

16. A method of jump starting an electric vehicle, the method comprising:
- receiving, at a wiring connector located within or adjacent to a tow hitch of the electric vehicle, a current from an external power source;
- transmitting the received electric current from the wiring connector to a positive terminal of a low voltage battery of the electric vehicle to at least partially charge the low voltage battery; and
- engaging a high voltage battery of the electric vehicle after the low voltage battery is at least partially charged.

17. The method of claim 16, further comprising directing current from the high voltage battery to the low voltage battery to continue charging the low voltage battery.

18. The method of claim 16, wherein the external power source comprises a second low voltage vehicle battery.

19. The method of claim 16, further comprising converting the high voltage from the high voltage battery to a lower voltage.

20. The method of claim 16, wherein the wiring connector is disposed on an external surface of the vehicle.

21. The method of claim 16, wherein the wiring connector comprises a trailer hitch wiring connector.

* * * * *